United States Patent Office 3,382,094
Patented May 7, 1968

3,382,094
FLUID AND MOLD RESISTANT CELLULOSIC MATERIALS AND PROCESS THEREFOR
George F. Bulbenko, Levittown, and Stephen W. Osborn, Yardley, Pa., assignors to Thiokol Chemical Corporation, Bristol, Pa., a corporation of Delaware
No Drawing. Filed May 19, 1964, Ser. No. 368,684
10 Claims. (Cl. 117—138.5)

ABSTRACT OF THE DISCLOSURE

Cellulosic material is made fluid and mold resistant by treating a cellulosic substrate with a fluid episulfide monomer and thereafter converting the fluid episulfide monomer to a solid polymer to form a barrier therein.

---

The present invention relates to novel fluid and mold-resistant cellulosic materials and to a novel process for their preparation.

An object of this invention is to provide cellulosic materials which show substantial resistance to penetration by fluids, and substantial resistance to the formation of mold thereon.

Another object of this invention is to provide a novel process for the treatment of cellulosic materials to impart thereto substantial fluid-resistant and mold-resistant properties.

Other objects of this invention will be inherent in or become obvious from the following explanations and examples.

It has been unexpectedly found that cellulosic materials, hereinafter called "materials," such as wood, wood derived materials like paper, and other cellulosic materials like cotton, may be made substantially resistant to penetration and permeation by fluids, especially liquids, and be made substantially resistant to the growth of mold thereon if they are treated by the process of the present invention, which provides therein a substantially fluid and mold-resistant barrier of solid poly (episulfide) polymers.

Poly (episulfide) polymers are polymeric organic monosulfide polymers, viz $+R-S+_x$, formed by the cleavage of episulfide rings on vicinal episulfide monomeric molecules, and their homo- or copolymerization, as characterized in the following equation:

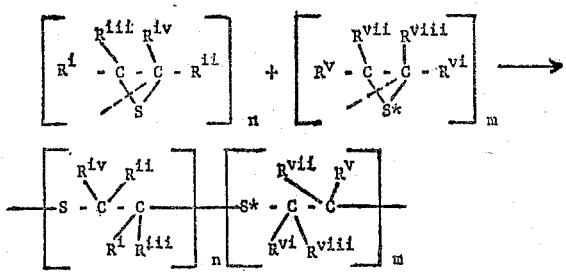

wherein the R's may be hydrogen as in ethylene episulfide, or aryl as in styrene sulfide, or alkyl as in propylene and butylene episulfides, or cycloalkyl as in cyclohexene sulfide.

Therefore, by poly (episulfide) is meant, according to the invention, polymers formed primarily from one or more vicinal episulfide monomers, viz.

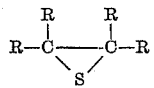

including aryl episulfides such as styrene episulfide, and alkylene sulfides such as ethylene sulfide, propylene sulfide, 1,3-butylene sulfide, 2,3-butylene sulfide, isobutylene sulfide and cyclohexene sulfide. The polymers used may be either homopolymers or interpolymers of two or more of such episulfide monomers. Various other episulfide monomers can be copolymerized with the aforementioned monomers. Some such episulfide monomers are also vicinal episulfides, such as butadiene monoepisulfide and 1,2-epoxy-3, 4-epithiobutane. Other cyclic non-vicinal episulfides having the structure:

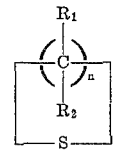

wherein $n=3, 4, 5$, or $6$, and $R_1$ and $R_2$ may be heterocyclic, alicyclic, bicyclic, polycyclic, and may be H, lower branched or linear alkyl groups having from 1 to 10 carbon atoms, aryl, arylalkyl and/or alkylaryl groups, such as trimethylene sulfide, pentamethylene sulfide and hexamethylene sulfide, may also be used as comonomers to the extent of about up to 20 mole percent with the above prescribed vicinal episulfides to prepare the solid poly (episulfide) poymmers useful in the practice of this invention.

Still other monomers may be used to a minor extent, say no more than 20 mole percent, to form with the foregoing prescribed vicinal episulfides the present useful polymers.

Among these useful comonomers which also may be used to a minor extent are those which have the structure:

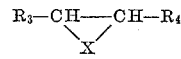

in which X is O or NH and $R_3$ and $R_4$ may be H, a lower branched or linear alkyl group having from 1 to 10 carbon atoms, an aryl, an arylalkyl and/or an alkylaryl group. $R_3$ or $R_4$ may also be heterocyclic, alicyclic, bicyclic or polycyclic, for example styrene oxide, ethylene oxide, propylene oxide, 1,2-butylene oxide, 2,3-butylene oxide, ethylene imine and propylene imine. Other polymerizable compounds like formaldehyde, trioxane, hydroxyisobutyric acid, tetrahydrofuran, 1,3-dioxolane, 1,4-dioxane, trimethylene oxide, tetramethylene oxide and pentamethylene oxide may be used to the limited extent indicated above.

The useful polymers, whether poly (episulfide) homopolymers or interpolymers, are generally designated herein merely as "poly (episulfide) polymers." When fluid episulfide monomers and the solid poly (episulfide) polymers which are in solution are referred to in the sense of equivalent substances, they are generally designated herein as "fluid episulfides."

The selection of the particular solid poly (episulfide) polymer for a particular application will depend on the type of fluid resistant properties desired in the material as well as on the solubility properties of the polymer itself. The preferred fluid and mold-resistant solid poly (episulfide) polymers used according to the present invention are polymers made substantially or completely of ethylene sulfide. Other poly (episulfide) polymers such as those made completely or substantially of propylene sulfide, and which are soluble in organic solvents, on the other hand, can be formed as polymers outside of the material, according to the present invention, and subsequently introduced therein in the form of polymer solutions. The propylene sulfide polymers would be used, according to the present invention, primarily to impart water and mold-resistance to the cellulosic materials treated therewith whereas the ethylene sulfide polymers, because of their enhanced resistance to penetration by a much larger number of fluids, would be used where it was desired to provide more extensive fluid resistant properties to the cellulosic materials.

Although catalysts are not essential to the practice of this invention, their use speeds polymer formation. Preferred catalysts used to form the polymers, according to the present invention are the Lewis acid catalysts such as $BF_3$, $PF_5$, $HClO_4$ and $H_2SO_4$. Other catalysts which may be used include the organo-metallic complexes associated with active-hydrogen bearing cocatalysts, such as are represented by the diethylzinc-water or the diethylzinc-$H_2S$ catalysts. In general, about up to 5 parts by weight of catalyst may be employed per 100 parts by weight of monomers being employed.

As indicated above, the present novel process for treating the cellulosic materials involves introducing a solid poly (episulfide) polymer into the material in question in any of two general ways, viz:

(1) Permeating the material with the monomers in fluid form, such as liquids or vapors and polymerizing them to form a solid barrier in situ; and/or
(2) Preforming the polymer, dissolving it in an organic volatile solvent, permeating the material with the solution of polymer, and removing the solvent by volatilization to provide a solid polymer barrier in the material.

The foregoing method is what is generally called herein as "treating the material with a fluid episulfide."

When the monomers are polymerized in situ in the material, the material may first be treated with a catalyst, such as described above, and then with the fluid monomers.

The manner of applying the catalyst and the fluid episulfide in the form of monomer or polymer to the material depends on the thickness and density of the substrate. The thinner and the more fluid permeable materials may be readily treated by either dipping or bathing the material or by applying such fluid episulfides to one or more surfaces of the substrate by any of the roller coating, brushing, doctor blade, vapor blowing, etc., fluid-to-substrate application procedures known. Thicker, more dense, or less permeable materials may require more stringent application methods, such as by pressure impregnation.

To provide sufficient permeation of the material by the monomers where the material is relatively thick in cross section or dense, it is usually enough to penetrate the surfaces of the material to a depth of up to only a few mils, i.e., 0.1 to 5 mils. The polymerization may then be conducted at temperatures of about 25° to 100° C. When a catalyst is used, depending upon the amount and type, polymerization will be essentially completed at these temperatures in intervals of from one minute to about 30 days. Where no catalysts are used, polymerization, in general, will usually take longer than where catalysts are present.

Where solid poly (episulfide) polymers are introduced into the material, they are in the form of solutes of organic solvent solutions. Common solvents useful in the practice of this invention, where the poly (episulfide) polymer is formed predominantly from propylene episulfide, are the aryl solvents, such as benzene and toluene, the alkanes, such as hexane and heptane, and chlorinated solvents such as carbon tetrachloride and dichloromethane.

The organic solvent soluble poly (episulfide) polymers, in general when polymerized in a medium containing substantial quantities of organic solvent, need not be separated from the reaction medium, but may be used as is to impregnate, permeate ar saturate the material. The solvent may then be removed by volatilization to leave behind a solid fluid and mold-resistant polymer barrier in the material.

The fluid and mold-resistant barrier formed in the material, according to the present invention, either by in situ polymerization, or by treatment of the material with solutions of preformed polymer, is not necessarily a continuous film. Whatever its extent or form within the material however, it does provide a substantial barrier to penetration by fluids, and to mold growth.

The following examples are merely illustrative of modes of practice of the present invention, and do not seek to define its scope.

EXAMPLE 1

Dry wooden splints were soaked in liquid ethylene sulfide monomer for at least one day. The treated splints were then removed from the monomer and air dried. Deposits of solid white polymer were observed in the surface crevices of the wood. The treated splints and untreated splints were partially immersed in wet mud from a stream bank. Within 10 days marked discoloration of the untreated splints both above and below the point of immersion in the mud was observed together with mold formation, which indicated substantial penetration of the splints by water. The treated splints in this same interval, however, showed only slight discolorations and no mold formation.

In similar manner, paper may be treated by wetting in liquid episulfide, or by exposure to vapors of episulfide monomers and such monomers be polymerized in situ to form fluid and mold-resistant paper articles.

Paper and wood articles may also be made fluid and mold-resistant by treatment with solutions of poly (episulfide) polymers.

EXAMPLE 2

Strips of filter paper and cotton fabric were immersed in 0.5% $BF_3$-etherate solution of diethyl ether, dried, and immersed in liquid ethylene sulfide. The paper and cotton were dried. Drops of various liquids were placed on the surface of the treated strips, and also on untreated strips of filter paper, and cotton to observe the degree of rapidity of penetration of the liquids into the materials.

Where complete penetration occurred, it is noted as "P" in the table below. Where the drops did not penetrate at all, it is noted as "R"; where penetration was only slight, it is noted as "S." The time to achieve complete penetration is noted as "I" for immediate, and numerically in minutes for other intervals.

| | Penetration of Substrates by Fluids | | | |
|---|---|---|---|---|
| | Paper | | Cotton | |
| | Treated | Untreated | Treated | Untreated |
| Water: | | | | |
| Degree | R | P | R | P |
| Time | | I | | I |
| Lubricating Oil: | | | | |
| Degree | P | P | S | P |
| Time | 10 | 10 | | 10 |
| Toluene: | | | | |
| Degree | S | P | P | P |
| Time | | I | I | I |

EXAMPLE 3

In similar manner to that used in Example 2, strips of paper and cotton were treated with propylene sulfide monomer and tested with various fluids. All treated substrates showed substantial water repellency (R) and moderate resistance to penetration by benzene and toluene whereas the corresponding untreated substrates showed almost instant penetration by the foregoing liquids.

We claim:
1. A process to provide a fluid and mold resistant cellulosic material comprising
    (a) treating the material with a fluid episulfide so as to substantially permeate at least the surfaces of said material with said fluid episulfide, and
    (b) converting said fluid episulfide to a solid poly (episulfide) polymer within said material to form therein a substantially fluid and mold resistant barrier.
2. A process as in claim 1 wherein said fluid episulfide is at least one fluid episulfied monomer.

3. A process as in claim 2 wherein said fluid episulfide monomer is ethylene episulfide.

4. A process as in claim 1 wherein said fluid episulfide is at least one poly(episulfide) polymer dissolved in an organic solvent.

5. A process as in claim 4 wherein said poly(episulfide) polymer is poly(propylene episulfide).

6. A process as in claim 1 wherein said converting said fluid episulfide is by polymerization of a fluid episulfide monomer.

7. A process as in claim 1 wherein said converting said fluid episulfide is by removal through volatilization of the organic solvent of a poly(episulfide) polymer solution.

8. A fluid and mold resistant material comprising a cellulosic substrate having a substantially fluid and mold resistant barrier therein comprising a solid poly(episulfide) polymer.

9. A material according to claim 8 wherein said polymer is poly(ethylene episulfide).

10. A material according to claim 8 wherein said polymer is poly(ethylene episulfide).

References Cited

UNITED STATES PATENTS

| | | |
|---|---|---|
| 2,225,573 | 12/1940 | Tendeloo _____ 167—33 |
| 2,466,963 | 4/1949 | Patrick et al. |
| 2,828,318 | 3/1958 | Reynolds. |
| 3,071,593 | 1/1963 | Warner. |
| 3,213,108 | 10/1965 | Osborn et al. |

WILLIAM D. MARTIN, *Primary Examiner.*

T. DAVIS, *Assistant Examiner.*

UNITED STATES PATENT OFFICE
CERTIFICATE OF CORRECTION

Patent No. 3,382,094                                      May 7, 1968

George F. Bulbenko et al.

It is certified that error appears in the above identified patent and that said Letters Patent are hereby corrected as shown below:

Column 2, line 25, "poymmers" should read -- polymers --. Column 3, line 68, "ar" should read -- or --. Column 6, line 4, "poly(ethylene episulfide)." should read -- poly(propylene episulfide). --.

Signed and sealed this 23rd day of September 1969.

(SEAL)
Attest:

Edward M. Fletcher, Jr.                             WILLIAM E. SCHUYLER, JR.
Attesting Officer                                            Commissioner of Patents